United States Patent
Kovacs

[15] 3,689,182
[45] Sept. 5, 1972

[54] EXTRUDER PROVIDING RADIAL AND AXIAL MELT REMOVAL

[72] Inventor: Lloyd Kovacs, Somerset, N.J.

[73] Assignee: Midland-Ross Corporation, Cleveland, Ohio

[22] Filed: March 27, 1970

[21] Appl. No.: 23,200

[52] U.S. Cl. ..................425/208, 259/105, 259/191, 425/378
[51] Int. Cl. ...............................................B29f 3/02
[58] Field of Search....18/12 SM, 12 SC, 12 SE, 30 SM; 425/208, 378

[56] References Cited

UNITED STATES PATENTS

| 3,358,327 | 12/1967 | Maillefer..................18/12 SM |
| 3,496,603 | 2/1970 | Listner et al...........18/12 SM |
| 3,239,883 | 3/1966 | Ferrari...................18/12 SM |
| 3,271,819 | 9/1966 | Lacfier...................18/12 SM |
| 3,021,561 | 2/1962 | Reifenhäuser.......18/12 SC X |

FOREIGN PATENTS OR APPLICATIONS

| 420,581 | 3/1967 | Switzerland.............18/12 SM |
| 1,092,186 | 11/1960 | Germany.................18/12 SC |

Primary Examiner—J. Spencer Overholser
Assistant Examiner—B. D. Tobor
Attorney—Woodrow W. Portz and Irvin L. Groh

[57] ABSTRACT

Apparatus utilizing a screw type extruder for reducing a solid thermoplastic material to a fluid by maintaining a spiral body of continuous width of the material in continuous contact with the barrel of the extruder and separating the melted fluid from the solid body as rapidly as formed by conducting it through radial passageways into a low pressure axially extending region of the extruder screw.

5 Claims, 13 Drawing Figures

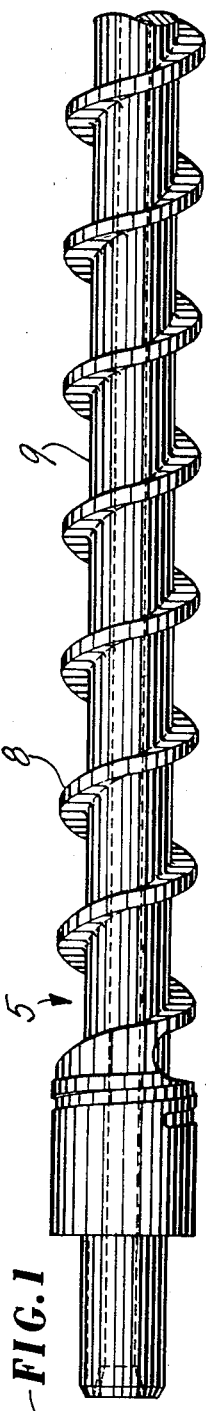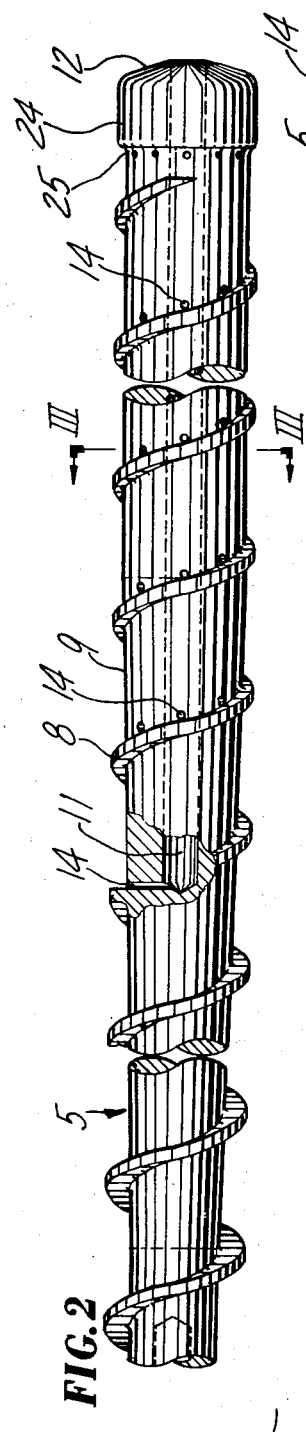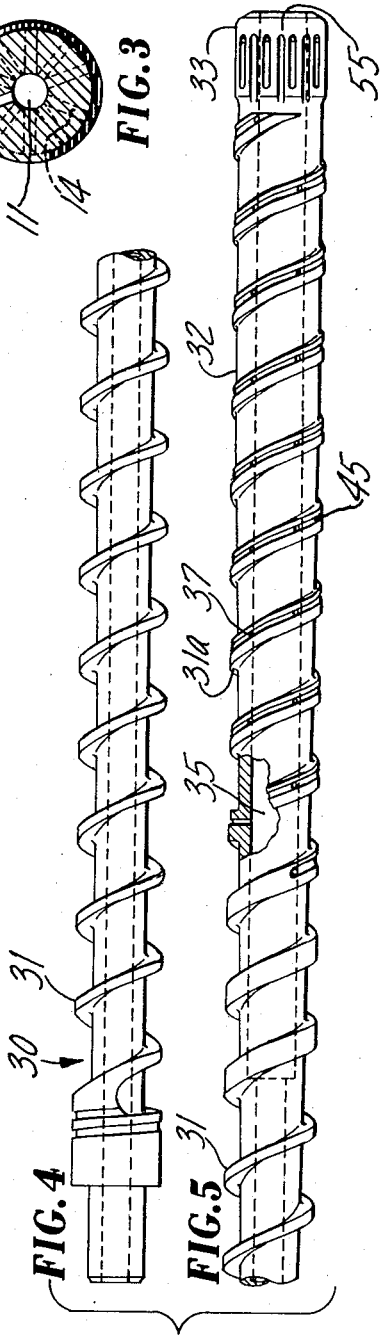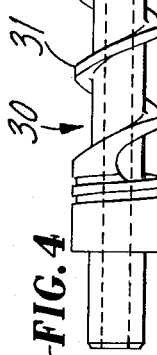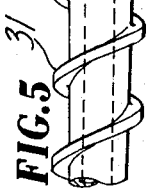
FIG.1
FIG.2
FIG.3
FIG.4
FIG.5

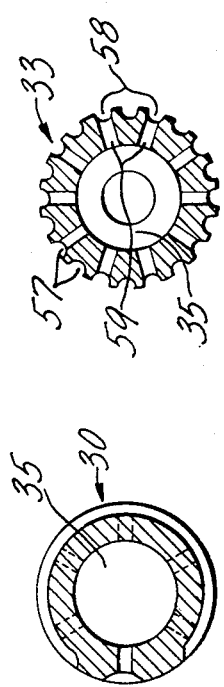
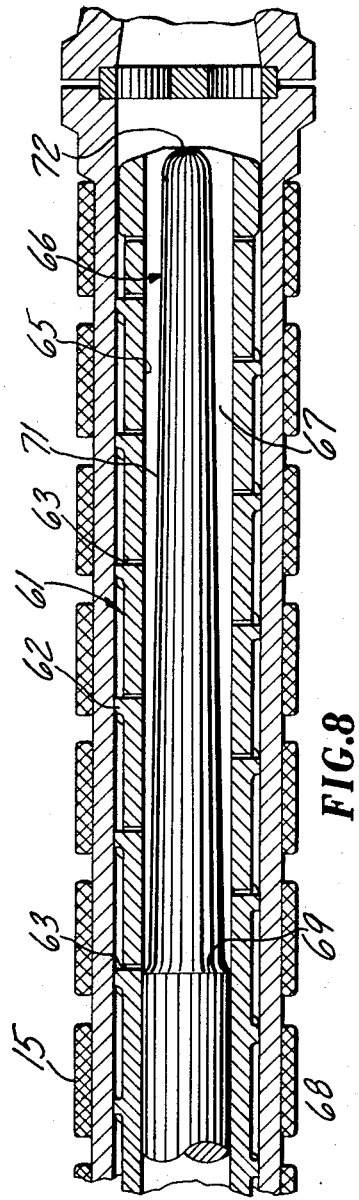
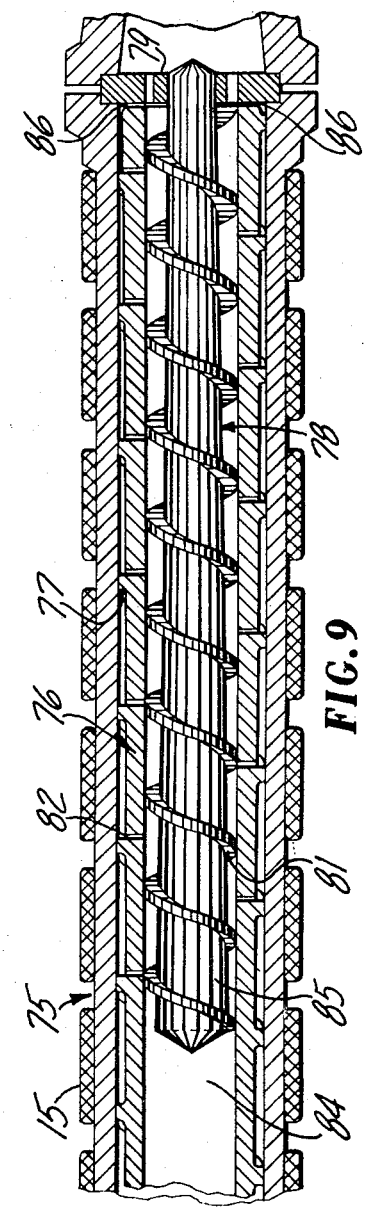

EXTRUDER PROVIDING RADIAL AND AXIAL MELT REMOVAL

DESCRIPTION

In the disclosure of a co-worker as set forth in patent application Ser. No. 799,430, now abandoned, it is recognized apparently for the first time that a very effective way of converting a solid thermoplastic material to melted condition is to structure the extruder so as to maintain a spiral body of thermoplastic material at constant width as measured crosswise of the width of the extruder screw channel while progressively lessening the thickness of the spiral body. This is accomplished by progressively lessening the radial depth of the channel in the lengthwise direction of the screw. The melted material is given little or no opportunity to mix with the spiral body but is squeezed to a separate channel as rapidly as formed.

The present invention makes use of a principle disclosed by the co-worker that only a very thin film of melted material, e.g., not more than in the order of 0.010 inch to 0.015 inch, should be permitted at the interface of the barrel surface and the progressively thinning spiral body of solid material. According to this earlier disclosure, the melted material wiped from the interfacial region between the barrel and the solid material was trapped within a groove or channel formed in the screw thread along the trailing side of the spiral body and thence pumped by the pressure action of the screw toward the discharge or front end of the extruder. The present invention provides a different arrangement for removing melted material from the solid body along substantially a continuous portion thereof throughout the melting section of the extruder. In a preferred embodiment, the conventional metering section is eliminated with conversion thereof to additional melting facility.

The present invention also recognizes a disclosure from the prior extruder art to remove melted material from a gradually laterally narrowed channel defined by the screw thread and the barrel through openings extending from the cylindrical outer surface of the thread to an axially extending passageway of the screw. This arrangement results in considerable heating of the melt as a result of the sheer forces imposed thereon as the melt passes into the small clearance region between the outer periphery of the thread and the internal surface of the barrel. This prior art arrangement also does not utilize the principle of melting inherent in the use of a progressively shrinking screw channel of constant transverse width.

An important object of the present invention is to provide a barrel and screw device for converting a thermoplastic solid material to fluid extrudable condition with less consumption of power per unit weight of feed material than is required by conventional equipment.

Other objects ancillary to the object just stated are to achieve greater throughput rate from equipment according to the invention than from prior art equipment of comparable size; and/or the provision of lower capacity driving equipment than needed to achieve given throughput rates by the prior art devices.

It is also an object to efficiently separate the melt from the solid material as rapidly as formed without subjecting it to any additional heating in order that overheating the melt may be avoided.

A further object is to operate a screw type extruder with the load thereof comprising essentially solid material within the full length of the channel defined by the screw and the barrel. In this connection, it is desired to have the extruder so constructed as to maintain the solid material in an essentially unitary spiral body protected from fragmentation by any lateral constriction but with continuous urging of the spiral body against the barrel for the purpose of squeezing any melted material toward an escape region communicating with a low pressure region such as provided interiorly of the screw.

An object ancillary to the forgoing object is to maximize temperature drop between the barrel and the spiral body so as to establish highly effective heat transfer between the barrel and the solid material as a result of rapid removal from melted material along the interface.

Still another object is to separate the melted material from the unmelted material as rapidly as possible in order that the load may be essentially unmelted material thereby utilizing the tendency of the screw to convey or pump a solid material more efficiently than a fluid material.

It is also an object to promote the movement of melted material from the interior of the screw by structure which assures that the melted material may be discharged from the extruder in a thoroughly mixed condition and that the extruder has no tendency to become clogged.

These and other objects are achieved by providing an extruder differing from the prior art primarily in the construction of its screw and, in related specific embodiments, in structure assuring orderly mixing of melted material and the removal thereof from the interior of the extruder. The screw comprises a core and a thread so interrelated in cooperation with the barrel as to define a continuous spiral channel and a melt section including a substantial portion of the length of the channel to terminate adjacent the front or material-discharging end of the screw. The thread and the core of the screw are shaped through the melt section, proceeding in the direction of material advancement, to progressively decrease the depth of the channel without substantial change in its width but with corresponding progressive decrease in transverse cross section. The melt section is terminated near the end of the screw with clearance with the barrel so as to prevent any substantial passage of melted material past the end of the screw. As an essential feature of the invention, the core has an interior axially-extending passageway and a series of openings spaced along the leading side of the thread through the full length of the melting section extending into the passageway. The openings are in freeflow relation with the channel, such as by entering the screw along the junction of the thread and the core, or along leading side surfaces of the thread whereby melted material may pass readily from the interface of the solid body and the barrel into the openings without the creation of heat-producing sheer forces.

In the drawing with respect to which the invention is described:

FIGS. 1 and 2 are substantially contiguous longitudinal portions of a single extruder screw in accordance with one embodiment of the invention;

FIG. 3 is a diametral section of the screw of FIGS. 1 and 2 taken along the line III—III of FIG. 2;

FIGS. 4 and 5 are substantially contiguous longitudinal portions of a modified screw;

FIGS. 6 and 7 are diametral sections taken along lines VI—VI and VII—VII, respectively, of FIG. 5;

FIG. 8 is a fragmentary view in longitudinal section of an extruder comprising a hollow screw and an unsectioned flow-controlling taper pin received within the screw;

FIG. 9 is a fragmentary view of an extruder illustrating the barrel and rotating screw thereof in longitudinal section to expose in full view a stationary screw received by the rotating screw;

FIGS. 1 and 2 portray rear and front sections of a screw 5, respectively, received during operation within a barrel 7 (see FIG. 11) and comprising a thread 8 of uniform pitch and a core 9 which increases in diameter in the rear to front axial direction in accordance with a desired pattern. The thread 8 is constructed with a uniform outer radius for operation within a barrel having a bore of uniform diameter. In order to obtain optimum efficiency of an extruder constructed as disclosed herein, the barrel and the screw are constructed with as small a clearance between the radially outer surface of the thread and the inner surface of the barrel as can practically be achieved under modern machine shop conditions. This clearance will ordinarily be in the order of 0.005 inch although less clearance is desired if it can be achieved without great cost. Such clearance is to be minimal, since entry of melted material (hereinafter called "the melt") into the clearance between the thread periphery and barrel subjects such material to continued heating, if not over-heating, and the consumption of energy as the result of severe sheering action to which the melt is subjected as it enters and traverses the clearance region.

Figure 11:
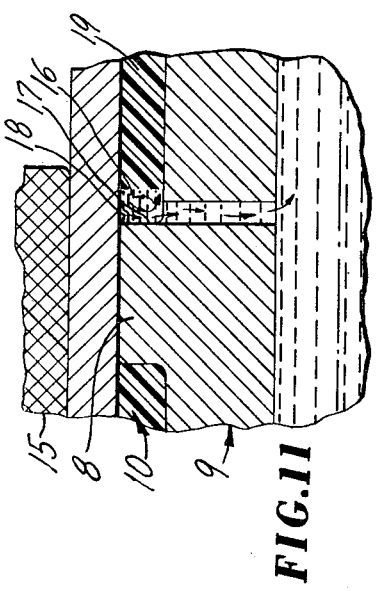
FIG. 11 is a fragmentary view in section of an extruder including the screw of FIGS. 1 and 2 illustrating the manner in which liquid material is collected and discharged from the screw.

As typical dimensions of a screw constructed according to FIGS. 1, 2, 3, and 11, the latter figure being a greatly enlarged fragmentary cross section, the thread has a width of approximately thirteen-sixteenths inch and the channel 10 is approximately one-half inch in radial depth near the rear end of the melting section. The melting section comprises 30 to 40 percent of the length of a screw of approximately conventional length having a length-to-bore ratio in the order of 24:1. The screw 9 has an axial bore or passageway 11 extending from the front end 12 of the screw to the rearmost of radial openings 14. In the embodiment of FIGS. 1, 2, and 11, the openings 14 extend radially through the core from the junction of the leading side of the thread 8 with core 9 to the passageway 11.

Referring to FIG. 11, the load of thermoplastic material, normally introduced into the extruder as pellets, is formed within the rearward section of FIG. 1 into a solid spiral body which to some degree becomes softened as it reaches the melting section identified by a core portion of flaring diameter and the openings 14 shown in FIG. 2. Under proper conditions of screw rotation and heating, the latter being derived from the barrel 7 and the heating element 15 therearound, the spiral body of thermoplastic material commences melting in the axial vicinity of the rearmost openings 14. As shown in FIG. 11, the melt forms in a small pool 16 along the leading side 17 of the thread 8. The pool 16 forms as shown because of the relatively high pressure created in the channel cross section in a region 18 right adjacent the leading top edge of the thread 8 as the result of the barrel urging the melt rearwardly against the leading side of the thread.

Pressure is sufficient to maintain the solid body 19 of the load forwardly within the channel against the rear or trailing side 21 of the next turn of the thread, i.e., the opposite side of the channel. The melt has a higher temperature than the solid material and, once passage thereof is established through the openings 14, the higher temperature of the melt tends to melt away the adjacent portion of the solid in proximity with the leading side 17 of the thread. Satisfactory removal of the melt is obtained with openings of one-eighth inch in diameter distributed serially along the leading face of the thread at uniform angular spacing in respect to the screw axis to dispose, e.g., six or eight openings for each turn of the thread.

The screw 5 terminates at its front end in a head 24 in the manner of the screw illustrated in FIG. 8. The head has the function of acting as barrier to continued passage of melt along the barrel and forcing the passage of melt essentially through the openings 14 and the circumferential row of openings 25 extending to the axial passageway 11 through the core immediately at the rear of the head. The head 24 is of such a diameter as to nearly prevent the passage of any melt between its outer cylindrical surface and the internal surface of the barrel. However, as the diameter of the thread 8 is constructed at the minimum practical clearance with the internal surface of the barrel to prevent any passage of melt thereover, the passage of a slight amount of melt between the head and the barrel is desirable in order to maintain the clearance between the head and the barrel free of stagnant overcured material. Hence the head 24 may be constructed to a slight smaller diameter than the thread, e.g., lesser than the thread diameter by 0.040 inch to provide a clearance region having a radial thickness, such as 0.025 inch, to permit sufficient flow of the melt therethrough to prevent fouling.

FIGS. 4, 5, 6, 7, and 12 illustrate a modified screw 30 of which FIG. 4 comprises primarily the feed section of the screw and FIG. 5 illustrates generally the melting section, the latter being characterized by increased thickness and special construction of thread 31. The melting section of the screw is further distinguished by a tapering core 32 which decreases in diameter or tapers from its front head 33 to a diameter located approximately at point 34. As shown, the melting section comprises about 40 percent of the length of the screw including the head 33 which is designed herein to also collect and pass melt to an axial passageway 35 which extends at least along that portion of the length of the screw having radial melt-receiving openings 37.

Figure 12:
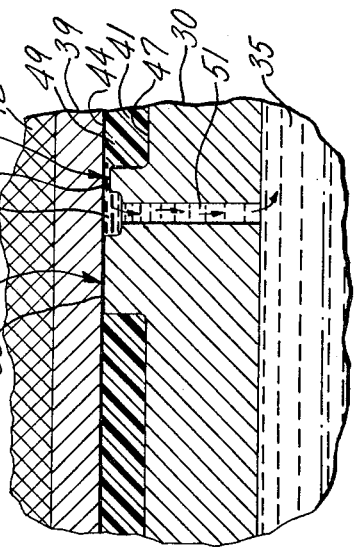
FIG. 12 is a fragmentary view including the screw of FIGS. 4 and 5 illustrating the manner of passage of melted material from the exterior of the screw to the interior thereof.

FIG. 12 is an enlarged sectional view along the axis of an extruder comprising the screw 30 and a barrel 39 within which the screw rotates to forward a solid thermoplastic body 41. The barrel 39 is heated by means such as electrical heating bands 42, for the purpose of heating the spiral body 41 by the conduction of heat through the interface of the barrel and the plastic material at 44. Under desirable operating conditions, the rate of heating the barrel and the speed of the screw are adjusted to obtain a very thin layer of melted material having a thickness, e.g., of 0.010 inch at the interface 44. As melted material along the interface of necessity flows from the leading side of the channel to the rearside and into the low pressure region, the thickness of the melt film developed at the interface tends to increase in a rearward direction over the width of the channel. In the embodiment of FIG. 12, the melt passes readily into a low pressure region or groove 45 formed between a rearside portion 31a of full thread radius and a leading side portion or ridge 31 b of smaller radius of the thread 30 which extends through the melting section of the extruder. Dimensionally, the radially outer surface 48 of the ridge 31b may be of one-eighth inch in width and the groove may have a width such as one-fourth inch. The radially lower extremity, i.e., the bottom, of the groove 45 is perforated by openings 51 which extend in a radial direction from the groove to the axial passageway 35 of the screw 30.

In the practice of this invention, it is essential that the ridge 31b be of less radius relative to the axis of the screw than the principal an outer radial surface 53 of the thread. The radius of the ridge 31b is sufficiently smaller than that of the surface 53 so that development of any appreciable sheer forces in melted material passing from the channel 47 into the openings 51 is avoided. A clearance between the ridge 31b and the barrel 39 of 0.025 inch or a ridge radius of 0.020 inch less than the radius of the surface 53 permits ready passage of melted material from the channel 44 into the passageways 51 and avoids such sheer forces which cause appreciable heating of the melted material in passing over the ridge 48. In general, the spiral solid thermoplastic body 41 will develop along the full length and volume of the channel 47 without the creation of a pool of melted material within the channel, such as the pool 16 described with respect to the embodiment of FIGS. 1,2 and 11.

Of further interest in connection with the embodiment of FIGS. 4–7 is the head 33 which has a smooth perimetric area 55 machined to form a desired clearance with the extruder barrel to restrain the passage of material through said clearance except for that necessary to prevent fouling. The head is formed with alternate longitudinally extending grooves 57 along its outer periphery which are open at their rear ends and contiguous with a portion of the screw of smaller diameter just rearwardly of the head 33. The forward ends of the grooves 57 are closed. The purpose of the grooves 57 is to trap any solid particles of material passing the whole length of the screw 30.

The head 33 has another set of alternate grooves 58 which are closed at both their front ends and rear ends. The head 33 also has openings 59, each of which extends from one of the closed end grooves 58 into the axial passageway 35. The purpose of the grooves 58 and the openings 59 is to collect melted material transferred from the open ended grooves 57 through the clearance between the head and the extruder barrel. Such melted material may also pass forwardly into an end zone of extruder past the end of the head through the non-fouling clearance between head area 55 and the barrel.

Figure 10:
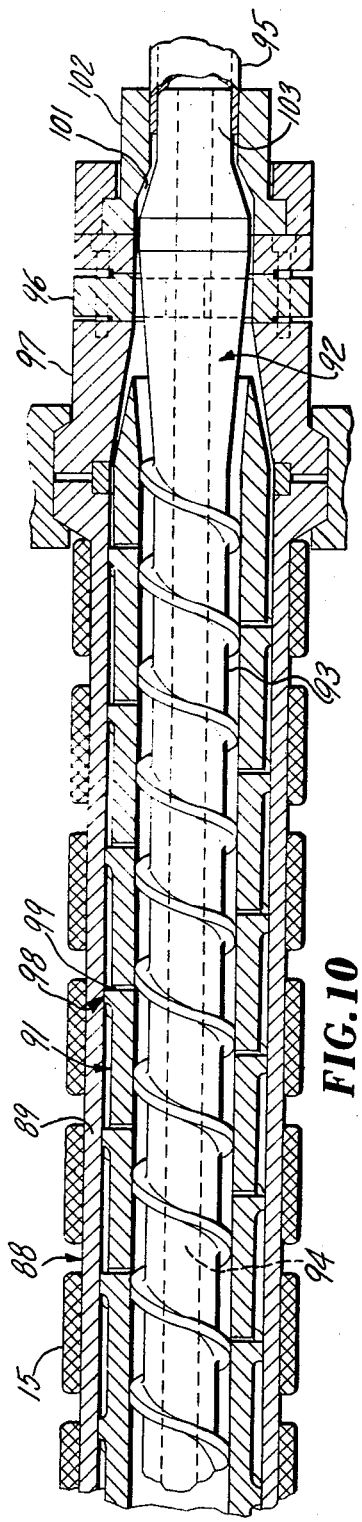
FIG. 10 is a fragmentary view of still another extruder with the barrel and rotating screw thereof shown in longitudinal section to expose a stationary partially threaded tube-shaping mandrel.

FIGS. 8, 9 and 10 relate to more specific embodiments of the invention directed to preventing any clogging of the route for axial passage of the melt along the interior of the screw. FIG. 8 illustrates a hollow extruder screw 61 having a thread 62 and radial melt-conducting openings 63 arranged as described in connection with the embodiment of FIGS. 1,2,3 and 11. As shown, the screw 61 has a somewhat cylindrical bore 65 within which a mandrel 66 is received for the purpose of defining a passageway 67 of varying cross section. The mandrel 66 has a portion 68 which diametrically matches the interior surface of the screw and thus terminates the passageway 67 at its rear end along a shoulder 69 of the mandrel. The shoulder 69 is located just rearwardly of the rearwardmost passageway 63. The mandrel comprises a cone 71 which tapers in the forward direction of the extruder and may terminate at the forward end of the screw as shown in an end surface 72. In order that the interior of the screw 61 may be self-cleaning, the cone tapers in an approximate manner in accordance with the cumulative capacity of the openings 63 as measured in the direction of material advancement of the extruder.

FIG. 9 illustrates a modified extruder having a rotating screw 76 of which its thread 77 terminates adjacent the spider 79. The screw 76 has a generally cylindrical bore in which is received a stationary and oppositely threaded screw 78 fixed to the spider 79 secured within to the end of the extruder barrel. The thread 81 of the stationary screw is preferably fitted at close clearance with the inner surface of the rotating screw 76 in order that material may be received from radial openings 82 and transferred through the spider 79 without any fouling of the interior of the screw 76. The screw 78 by standing still while the screw 76 revolves therearound both forwards and mixes material entering the interior region 84 of the rotating screw. The core 85 of the stationary screw preferably tapers toward the front end of the extruder in order that melt may substantially fill the channel of the stationary screw and good mixing without excessive admixture of air or other gas may be accomplished within the interior of the rotating screw. In the end surface of the rotating screw 76 are radial grooves 86 enabling passage of melt developed within the end portion of the barrel to the interior of the screw 76.

Figure 10A:
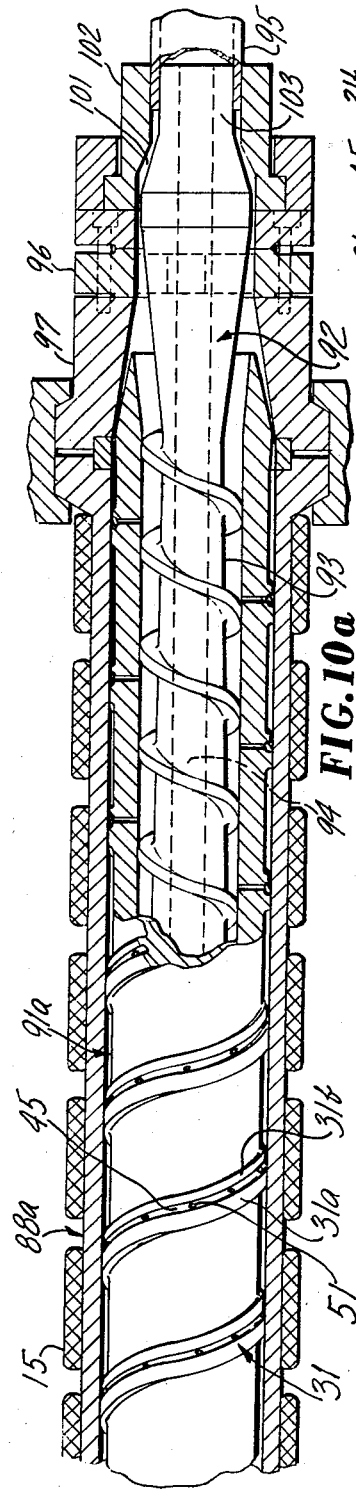
FIG. 10a is a fragmentary view, partly in section, of the extruder of FIG. 10, having its screw formed with a grooved thread similar to that provided on the screw of FIGS. 5 and 12.

FIG. 10 illustrates extruder equipment of the type which may be used to produce a tubular product, such as blown film. Extruder 88 has a barrel 89, a rotating screw 91, providing an axial bore, and an internal screw and die member 92 received within the bore of the rotating screw. The core 93 of the screw and die member 92 has an axial bore or passageway 94, which may be used for cooling air, or other gas used for expanding the tubular product 95 in film-blowing operations. The member 92 comprises a spider 96 which is secured to a spacing bushing 97 to maintain the member 92 in non-rotative fixed position and fixed relation with the barrel 89. As shown in FIG. 10, the rotating screw 91 is constructed with a thread 98 and passageways 99 similar to those described with respect to the embodiment of FIGS. 1,2,3 and 11. The front end portion of the rotating screw terminates at close clearance with the sleeve 97 to allow passage of melt between the barrel and the sleeve while the melted load essentially is passed through the radial openings 99 into the reach of the stationary screw portion of the member 92. By the combined forces exerted by both the rotating screw and the stationary screw, material is delivered to the annular tube-forming region 101 defined by the exterior die member 102 and the mandrel portion of member 92 in a thoroughly mixed condition. FIG. 10a illustrates a minor modification of the extruder design shown in FIG. 10, wherein a modified extruder 88a has a rotating screw 91a provided with the grooved thread 31 heretofore described as a portion of the screw 30 of FIGS. 5 and 12. In a manner already described with respect to FIGS. 5 and 12, melted material may pass into the groove 45 and through openings 51a into the bore 94a and then be acted upon by stationary screw means, such as the screw and the die member 92. The melted material is removed from the central bore of the screw 88a by the stationary screw and die member 92 in a manner heretofore described with respect to FIG. 10. The letter "a" is added to numerals of FIG. 10 to provide numerals in FIG. 10a for analogous but modified parts.

I claim:

1. An extruder having a rotatable screw and a barrel enclosing said screw;

said screw comprising a core and a thread so interrelated in shape as to define a continuous spiral channel, and a melt section including a substantial portion of the length of the channel to terminate adjacent a front or material-discharging end of the screw;

said thread and core being shaped through said melt section in the direction of material advancement to progressively decrease the depth of said channel without substantial change in its width and to define a progressive corresponding decrease in transverse cross section of said channel, said channel terminating adjacent a peripheral end surface of the screw having an annular clearance with the barrel;

said thread having throughout said melting section of the extruder a rearside portion of full thread radius and a leading side portion of smaller radius between which a groove is formed;

said screw having an interior axially-extending passageway and a series of openings extending radially from the groove to the passageway, said openings being distributed along the full length of the melting section to provide free flow of material from the groove to the passageway;

said clearance of the end surface of the screw with the barrel being of a smallness as to force passage of substantially all flowable thermoplastic material from a high pressure region within said channel to a low pressure region within said groove and outwardly of the screw through said openings and said passageway.

2. The extruder of claim 1 comprising:

a stationary screw and means connecting the front ends of said barrel in the stationary crew in fixed relationship, said stationary screw extending inwardly of said passageway to an extent placing it in radial relation with all of said openings and having a thread supported in close clearance with an internal surface of said rotatable screw defining said passageway.

3. The extruder of claim 2 wherein:

said stationary screw has a core, and the core and the thread thereof and said internal surface of the rotatable screw define an open transaxial cross sectional area which increases approximately in proportion to the cumulative flow-through capacity of said openings joining therewith as said stationary screw extends toward said front end.

4. The extruder of claim 2 comprising:

a screw and die member comprising said stationary screw disposed in said passageway, and an intermediate spider portion comprising a concentric radially-outward ring portion and a mandrel projecting axially beyond said spider portion;

an exterior die member disposed at an annular clearance with said mandrel; and annular spacer means and securing means for securing said screw and die member and said exterior die member in a desired axial relationship with said barrel.

5. The extruder of claim 4 wherein:

said rotatable screw and said screw and die member have contiguous axial passageways adapting the extruder for passage of a gas therethrough into a tubular product of said extruder.

* * * * *